No. 890,281.  
PATENTED JUNE 9, 1908.  
C. JOSEPH.  
FASTENER FOR SHADE BRACKETS  
APPLICATION FILED OCT. 30, 1907.
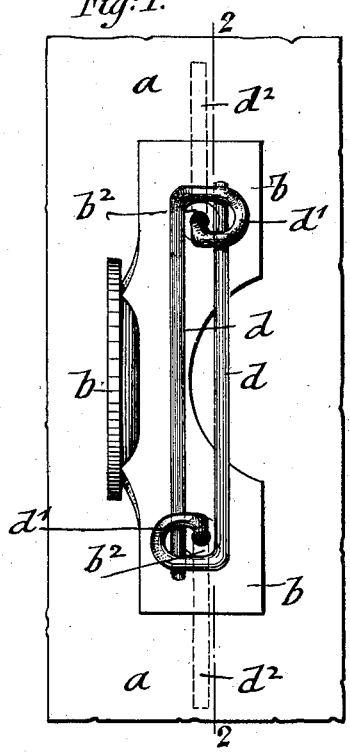
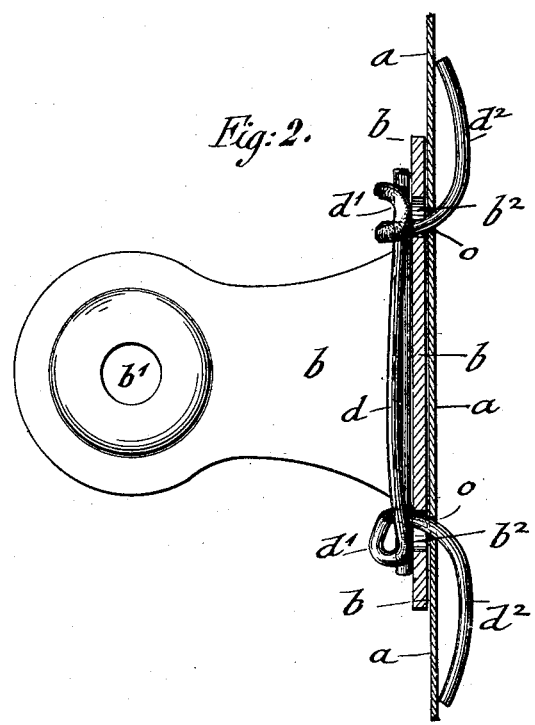

UNITED STATES PATENT OFFICE.

CARL JOSEPH, OF BAYONNE, NEW JERSEY, ASSIGNOR OF ONE-HALF TO FREDERICK J. KLOES, OF JERSEY CITY, NEW JERSEY.

FASTENER FOR SHADE-BRACKETS.

No. 890,281.  Specification of Letters Patent.  Patented June 9, 1908.

Application filed October 30, 1907. Serial No. 399,850.

*To all whom it may concern:*

Be it known that I, CARL JOSEPH, a citizen of the Empire of Germany, residing in Bayonne, in the county of Hudson and State of New Jersey, have invented certain new and useful Improvements in Fasteners for Shade-Brackets, of which the following is a specification.

This invention relates to improvements in fasteners for shade-brackets.

In fireproof buildings the window-casings are made of sheet-steel which is pressed into the proper shape. The ordinary shade-brackets cannot be attached to the metallic window-casings by the ordinary screws or nails.

The object of this invention is to supply a fastener for shade-brackets for use with metallic window-casings; and for this purpose the invention consists of a fastener for shade-brackets composed of two interlocking spring-tongues which are provided with curved ends that are passed through the usual holes in the base of the shade-bracket and through registering holes drilled into the window-casing, the outer ends of the spring-tongues being interlocked with retaining catches so as to form a reliable attaching device for the shade-bracket.

In the accompanying drawings, Figure 1 represents a front-elevation of a shade-bracket showing my improved fastener in position for attaching it to a metallic window-casing, and Fig. 2 is a side-elevation of the same partly in section on line 2, 2, Fig. 1.

Similar letters of reference indicate corresponding parts in both figures.

Referring to the drawings, $a$ represents a sheet-metal window-casing with which my improved shade-bracket is to be used. The shade-bracket $b$ is of the usual construction, stamped up from sheet metal of suitable thickness and provided in its bracket-portion with a hole $b^1$ for the pivot of the spring-roller and with the usual holes $b^2$ in the base-portion.

The fastening device by which the shade-bracket is attached to the metallic casing $a$ is composed of two separate spring-tongues $d$, which are preferably made of wire of suitable thickness and of a sufficient length to extend from one fastening hole to the other. Each spring-tongue $d$ is bent near its fastening hole $b^2$ into a laterally-extending U-shaped catch $d^1$ and a curved extension $d^2$, which latter is bent from the inner end of the catch approximately into line with the main portion of the spring-tongue. The free end of each spring-tongue $d$ is placed under the bent U-shaped catch $d^1$ of the other spring-tongue after the curved ends $d^2$ are passed through the holes $b^2$ in the shade-bracket and the holes $o$ drilled into the metallic window-casing, whereby the spring-tongues are held firmly in position parallel with and sidewise of each other, as shown in Fig. 1. The tension exerted by the interlocked spring-tongues on the curved inner ends presses them firmly against the inner surface of the sheet-metal casing, so that the bracket is rigidly held in position ready for receiving the spring-roller of the window-shade.

Having thus described my invention, I claim as new and desire to secure by Letters Patent:

1. The combination, with a window-casing having fastening holes, of a shade-bracket having fastening holes to register with said first-named holes, and separate spring-tongues passing through said holes so as to hold the parts together and having means whereby said tongues are interlocked with each other.

2. A fastener for shade-brackets comprising two separate spring-tongues, each having a curved end and a catch for retaining one end of the other spring-tongue.

3. A fastener for shade-brackets comprising two separate interlocking spring-tongues, each having a straight end, a curved end and an intermediate catch.

4. The combination, with a metallic window-casing provided with fastening holes, of a shade-bracket provided with holes in its base-portion registering with the holes in the casing, and two interlocking spring-tongues provided with curved ends that pass through the holes in the shade-bracket and window-casing to the inside of the latter and with catches for locking the opposite ends of the spring-tongues.

5. A fastener for shade-brackets, consisting of two interlocking spring-tongues, each spring-tongue being provided with a curved end extending approximately in line therewith and with a catch adapted to lock the other end of the other spring-tongue.

In testimony, that I claim the foregoing as my invention, I have signed my name in presence of two subscribing witnesses.

CARL JOSEPH.

Witnesses:
    PAUL GOEPEL,
    HENRY J. SUHRBIER.